United States Patent [19]

Fujisawa et al.

[11] Patent Number: 5,464,167
[45] Date of Patent: Nov. 7, 1995

[54] METHOD AND APPARATUS FOR THE JAM-FREE STARTING OF TAPE TRANSPORTATION

[75] Inventors: Shinobu Fujisawa, Akishima; Kazuhiko Nakagawara, Mitaka, both of Japan

[73] Assignee: TEAC Corporation, Tokyo, Japan

[21] Appl. No.: 87,610

[22] Filed: Jul. 7, 1993

[30] Foreign Application Priority Data

Jul. 7, 1992 [JP] Japan ................... 4-203011

[51] Int. Cl.⁶ .............. B65H 59/38; G03B 21/50; G11B 15/46; G11B 23/42
[52] U.S. Cl. .............. 242/334; 242/352.1; 242/412.2; 242/420.6; 360/71
[58] Field of Search .............. 242/334, 334.6, 242/352.1, 356, 412.2, 413.5, 418.1, 420.6; 360/85, 96.3, 96.4, 71; 318/7

[56] References Cited

U.S. PATENT DOCUMENTS

| | | | |
|---|---|---|---|
| 3,669,382 | 6/1972 | Struzina | 242/334.3 X |
| 3,914,668 | 10/1975 | Okamoto | 242/352.1 X |
| 4,030,131 | 6/1977 | Beiter et al. | 242/412.2 X |
| 4,163,532 | 8/1979 | Sakai | 242/334.2 |

*Primary Examiner*—John Q. Nguyen
*Attorney, Agent, or Firm*—Woodcock Washburn Kurtz Mackiewicz & Norris

[57] ABSTRACT

A tape transport is disclosed which is for use with a magnetic tape cassette. Under some specific thermal conditions the tape cassette may develop gaps between the reel hubs and the tape rolls thereon, such gaps being likely to lead to the jamming of the tape through the hunting of a tape speed control servo built into the tape transport. Therefore, for removing the gaps, the reels are successively rotated in a direction for winding up the tape, after the tape cassette has been loaded in the tape transport and before reading or writing. Preferably, the pair of reels are simultaneously rotated in opposite directions for taking up a possible tape slack between the reels prior to gap removal.

4 Claims, 7 Drawing Sheets

METHOD AND APPARATUS FOR THE JAM-FREE STARTING OF TAPE TRANSPORTATION

BACKGROUND OF THE INVENTION

This invention relates to magnetic tape transports, sometimes referred to as tape units, tape drives, tape decks, etc., for use with a replaceable tape assembly such as that known as a tape cassette or cartridge, and more particularly to digital magnetic tape transports used as a subsystem to enable a host system to obtain access to data on the magnetic tape. Still more particularly, the invention pertains, in such tape a transports, to a method of, and means for, starting reel-to-reel tape travel in either direction against the possibility of tape jamming.

Cassette tape transports, particularly to those operating in streaming mode, as contrasted with start/stop mode, have come to find extensive use as peripherals of computer systems. U.S. Pat. No. 4,163,532, filed by Sakai and assigned to the assignee of the instant application, discloses one such streaming cassette tape transport, or streamer. This prior art streamer comprises a pair of reel motors, to be drivingly coupled one to each reel of a tape cassette, for bidirectionally transporting the tape between the two reels, under the direction of a motor control circuit forming a part of a tape speed control servo. Also included in the tape speed control servo is a tape speed sensor comprising a roll for frictional engagement with the tape, and an encoder for generating a series of pulses representative of the actual tape speed. The motor control circuit causes one of the reel motors to be driven at constant speed in response to the speed sensor output pulses for tape transportation in each direction.

The tape must of course travel under proper, constant tension between the reels in order to enable the transducer to correctly write or read data on the tape. To this end the motor control circuit additionally comprises tension control means which afford constant tape tension in the face of varying tape diameters on both reels.

The streaming tape transport of the noted prior art construction has proved to possess a weakness in conjunction with the behavior of the tape cassette under specific temperature conditions, as has proved by testing. Assume that the tape cassette is put to use at elevated temperatures and then at reduced temperatures. Unavoidably, the reel hubs thermally expand during cassette operation at elevated temperatures and contract at reduced temperatures. The magnetic tape also undergoes such thermal expansion and contraction, but the radial expansion and contraction of the tape rolls are so much less than those of the reel hubs that gaps are created therebetween when the cassette cools after having been used at high temperatures.

Consequently, when tape transportation is started at lower temperatures, the takeup reel will immediately begin rotation with the takeup reel motor, but the tape roll on the takeup reel will not. The complete tape roll on the takeup reel will start rotation only after the gap has been removed by reel rotation. Being practically unloaded, the takeup reel motor will rotate at high speed until the removal of the gap. Thereupon the tape roll on the takeup reel will abruptly start rotation together with the file reel and with the tape roll thereon if there is no tape slack between the two reels, resulting in the sudden loading of the takeup reel motor. If there is a tape slack between the reels, on the other hand, then the takeup reel motor will again be suddenly loaded upon removal of the slack.

Such tape travel at abruptly changing speeds, and such instantaneous changes in load on the reel motors, are hazardous to the proper functioning of the tape speed control servo. The hazard becomes even greater by the presence of the gaps between the reels and the tape rolls thereon and of a tape slack between the reels, because then the traveling speed of the tape does not agree with the rotational speed of the takeup side reel motor. U.S. Pat. Appl. Ser. No. 979,639, filed Nov. 20, 1992 by Fujisawa et al. and assigned to the assignee of the instant application teaches how to take up a tape slack but is silent on the subject of how to remove the gaps between the reels and the tape rolls thereon.

Assume for example that the tape speed is unduly low. The tape speed sensor will produce pulses at correspondingly long spacings. The tape speed control servo will respond to such unduly long tape speed pulse spacings by correspondingly accelerating the takeup side reel motor, which actually may have been in rotation at high speed. The tape will then start traveling at inconveniently high speed and thus have to be decelerated greatly. The most likely result has been the hunting of the tape speed control servo. Such hunting has led to the jamming of the tape between the reels and the cassette housing in the worst case.

SUMMARY OF THE INVENTION

The present invention seeks, in tape transports of the kind defined, to prevent such hunting of the tape speed control servo and such jamming of the tape which have conventionally been easy to occur in the presence of gaps between the reels and the tape rolls thereon in a tape cassette or like tape assembly.

Briefly, the invention concerns, in a tape transport for use with a tape assembly to be loaded in, and unloaded from, the tape transport, the tape assembly having a length of tape extending between a pair of reels within a housing, a method of running the tape of the tape assembly which comprises, first of all, sensing the loading of the tape assembly in the tape transport. Thereupon the reels of the tape assembly are rotated, each for a preassigned brief length of time, in a direction for winding up the tape.

Each reel of the loaded tape assembly may be rotated from about 30 to 500 milliseconds. Experiment has proved that the gaps that may exist between the reels and the tape rolls thereon can be positively removed by successively driving the reels for such brief periods of time. Although the tape may travel with the rotation of the reels, the longitudinal displacement of the tape can be held at a minimum as the reels are driven in the opposite directions.

Possibly, the tape assembly on being loaded may have a tape slack between the reels in addition to the gaps between the reels and the tape rolls thereon. It is therefore recommended that the possible tape slack be taken up prior to gap removal, as by the method described and claimed in Fujisawa et al. U.S. Pat. Appl. Ser. No. 979,639 cross-referenced above. The gaps will be more infallibly removed, and the hunting of the tape speed control servo will be less likely to occur, if the tape has its slack eliminated previously.

The above and other features and advantages of this invention and the manner of realizing them will become more apparent, and the invention itself will best be understood, from a study of the following description and appended claims, with reference had to the attached drawings showing a preferable embodiment of the invention.

DESCRIPTION OF THE PREFERRED EMBODIMENT

Figure 1:
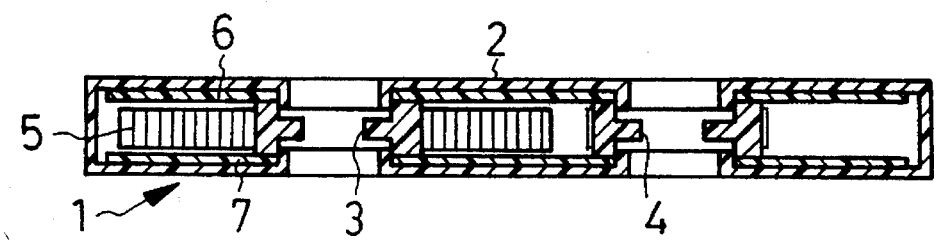
FIG. 1 is a section through the tape cassette suitable for use in the practice of this invention.

A preferred form of tape transport according to the invention, to be set forth subsequently, presupposes the use of the tape cassette shown in FIG. 1 and therein generally designated 1. Itself of conventional make, the tape cassette 1 has a cassette housing 2 of relatively flat box-like shape within which there are mounted a file reel or hub 3 and a takeup reel or hub 4 for rotation about spaced parallel axes. A length of magnetic tape 5, shown wound on the file reel 3, extends between the two reels along a predefined path. The cassette housing 2 has a pair of antifriction linings B and 7 attached to the inside surfaces of its opposite main sides in order to assure tape travel between both reels with a minimum of friction.

Figure 2:
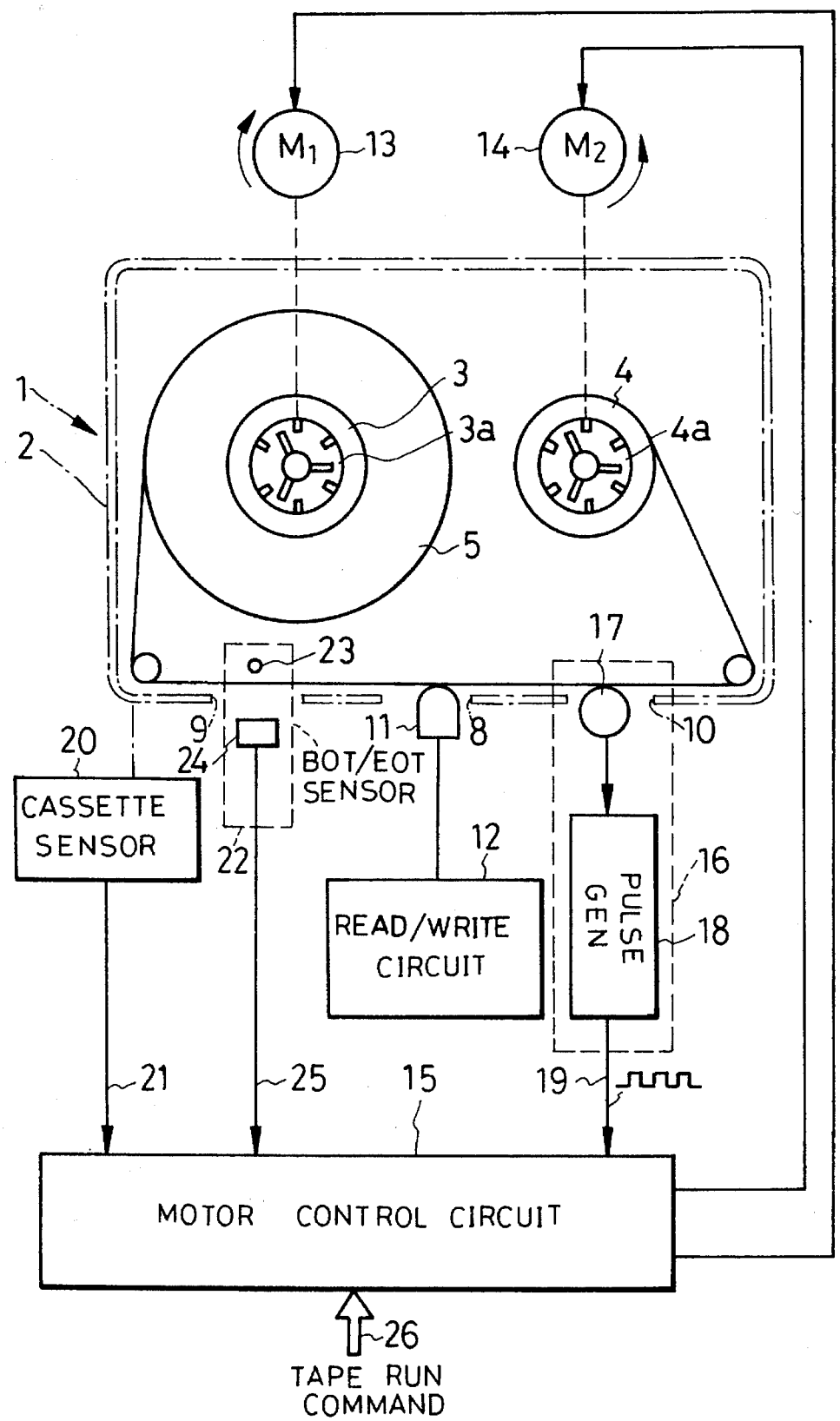
FIG. 2 is a block diagram of a tape transport for use in the practice of this invention, shown together with the tape cassette of FIG. 1.

FIG. 2 shows the preferred form of tape transport together with the tape cassette I loaded in position therein. The cassette housing 2 has a window 8 formed centrally in its front edge to expose part of the tape 5 extending between the reels 8 and 4. A magnetic transducer or read/write head 11 partly intrudes into the cassette housing 2 through the window 8 for data transfer with the tape 5. A read/write circuit 12 of any known or suitable design is coupled to the head 11. The cassette housing 2 has two other windows 9 and 10 formed on both sides of the central window 8, for purposes that will become apparent presently.

For bidirectionally running the tape 5 between the reels 8 and 4, there are provided a pair of reel motors 13 and 14 which preferably are controllable speed, direct current motors. The reel motors 13 and 14 have drive spindles 3a and 4a which make driving engagement with the respective reels 3 and 4 when the tape cassette 1 is loaded in position within the tape transport. The polarities of the reel motors 13 and 14 are so determined as to rotate in a direction for winding up the tape 5; that is, the file reel motor 13 rotates in a clockwise direction, as viewed in FIG. 2, and the takeup reel motor 14 in a counterclockwise direction.

The reel motors 13 and 14 are controllably driven by a motor control circuit 15 through a closed loop servomechanism. The tape speed control servo includes a tape speed sensor 16. As disclosed in Sakai U.S. Pat. No. 4,163,532, supra, the tape speed sensor 16 comprises a roll 17 and a pulse generator or encoder 18. The speed sensor roll 17 makes frictional contact with the tape 5 through the window 10 in the cassette housing 2. As this roll rotates with the travel of the tape 5, the encoder 18 photoelectrically generates a series of discrete tape speed pulses at a recurrence rate proportional with the tape speed. The tape speed pulses are sent over a line 19 to the motor control circuit 15.

Also connected to the motor control circuit 15 is a cassette sensor 20 which senses, either photoelectrically or electromechanically, the loading of the tape cassette 1 in position within the tape transport. The cassette sensor 20 sends its output to the motor control circuit 15 over a line 21.

Additionally, a beginning-of-tape (BOT) and end-of-tape (EOT) sensor 22 is connected to the motor control circuit 15. The BOT/EOT sensor 22 detects the BOT and EOT markers, not shown, of the tape 5. Typically, such markers are transparent end zones of the otherwise opaque tape 5. For sensing such transparent end zones, the sensor 22 is shown to comprise a light source 23 and a photodetector 24 disposed opposite each other across the tape 5. The noted window 9 in the cassette housing 2 is utilized toward this end. The BOT/EOT sensor 22 sends its output to the motor control circuit 15 over a line 25.

The motor control circuit 15 is itself under the control of a host system, not shown, to which the illustrated tape transport is to be connected as a data storage subsystem. The host system supplies various tape transportation commands to the motor control circuit 15 over a bus 26. Normally, such commands include a tape run command, forward run command, reverse run command, fast run command, and stop command.

Figure 3:
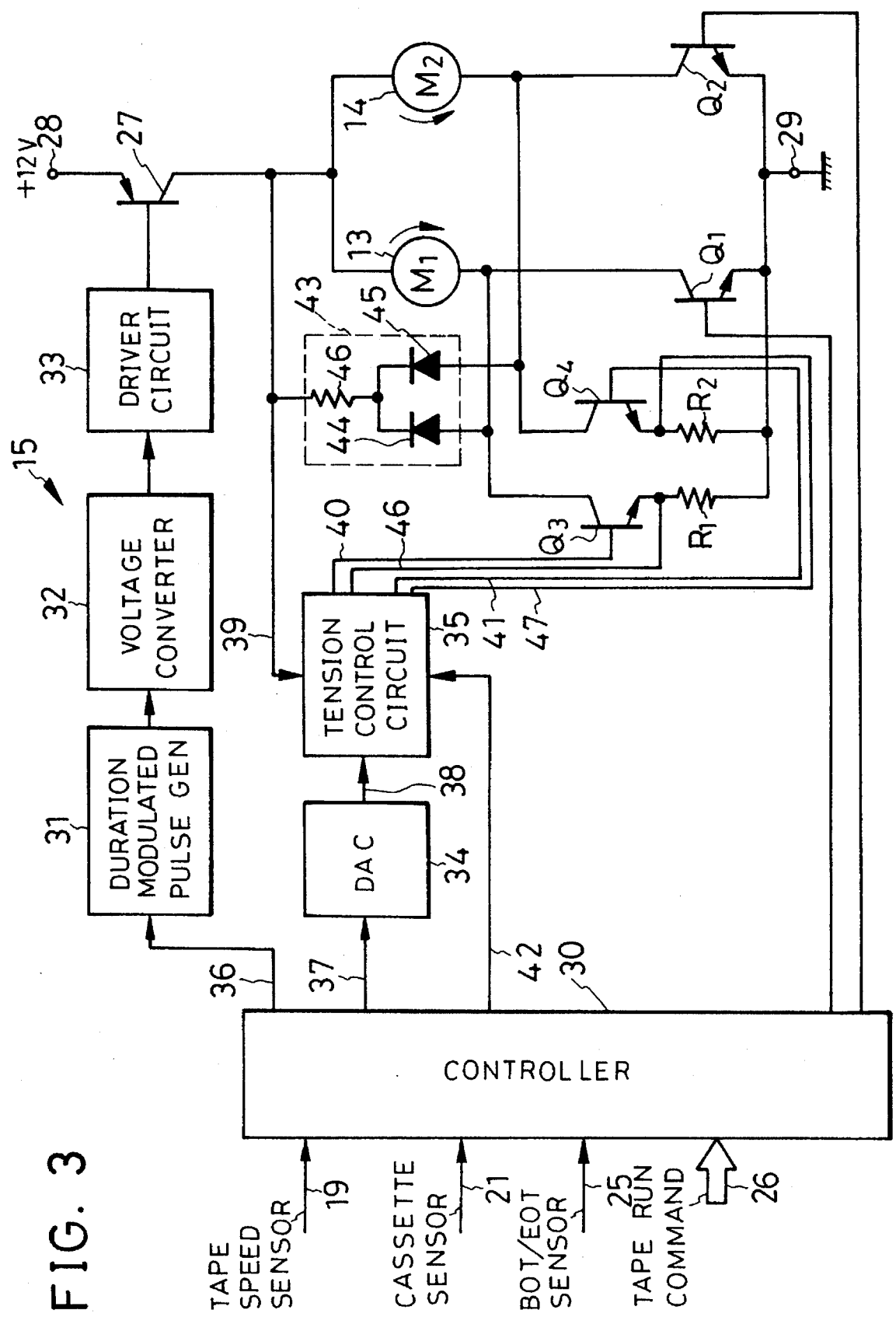
FIG. 3 is a block diagram showing in detail the motor control circuit of the FIG. 2 tape transport.

FIG. 3 is a detailed illustration of the motor control circuit 15 shown together with the reel motors 13 and 14. These reel motors are connected between a common 12-volt supply terminal 28 and a common grounding terminal 29. A speed control transistor 27 is shown connected between the reel motors 13 and 14 and the supply terminal 28 for controlling the magnitude of the supply voltage across both reel motors and hence the traveling speed of the tape 5, although two such transistors could be connected in series with the respective motors for the same purpose.

Two switching transistors $Q_1$ and $Q_2$, hereinafter referred to as the direction control transistors, are connected between the respective reel motors 13 and 14 and the grounding terminal 29. Also, the serial circuits of two tape tension control transistors $Q_3$ and $Q_4$ and two resistors $R_1$ and $R_2$ are connected between the respective reel motors 13 and 14 and the grounding terminal 29. Alternatively, however, the two tension control transistors $Q_3$ and $Q_4$ could be replaced by a single transistors connected to both reel motors via diode switches, as in the aforementioned Sakai patent.

The motor control circuit 15 includes a controller 30, which may take the form of a programmable microcomputer in practice, for controlling the speed control transistor 27, direction control transistors $Q_1$ and $Q_2$, and tension control transistors $Q_3$ and $Q_4$, either directly or indirectly. The controller 30 directly controls the direction control transistors $Q_1$ and $Q_2$, turning the file reel motor switching transistor $Q_1$ off, and the take-up reel motor switching transistor $Q_2$ on, for forward tape travel from file reel 3 to takeup reel 4, and the file reel motor switching transistor $Q_1$ on, and the takeup reel motor switching transistor $Q_2$ off, for reverse tape travel. However, for taking up a tape slack by a slack takeup routine of the tape control program introduced into the controller 30, both direction control transistors $Q_1$ and $Q_2$ will be jointly turned on and off. The slack takeup routine will be detailed subsequently.

The controller 30 also takes part in the speed control and tension control of the tape 5. First, for tape speed control, the controller 30 is connected to the base of the speed control transistor 27 via a serial circuit of a duration modulated pulse generator 31, a voltage converter 32 and a transistor driver circuit 33. For tape tension control, on the other hand, the controller 30 is connected to the bases of both tension control transistors $Q_3$ and $Q_4$ via a serial circuit of a digital to analog converter (DAC) 34 and a tension control circuit 35.

During writing or reading of data on the tape 5 by the head 26, FIG. 2, the controller 30 inputs the tape speed pulses from the tape speed sensor 16 over the line 19, determines the actual traveling speed of the tape from the recurrence rate of the tape speed pulses, and creates speed control data necessary for tape transportation at a desired constant speed. The speed control data is supplied over a line 36 to the duration modulated pulse generator 31, which then responds by generating a series of speed control pulses having their durations modulated accordingly. These pulses have a fixed cycle of, typically, sixty-four microseconds but are subject to change in duty ratio. The voltage converter 32 translates the incoming duration modulated speed control pulses into a unidirectional voltage with a magnitude determined by the pulse durations. Inputting this voltage, the driver circuit 33 causes conduction through the speed control transistor 27 to a corresponding degree, with the consequent application of the supply voltage of controlled magnitude to either of the reel motors 13 and 14.

The controller 30 is also preprogrammed to create data for taking up a tape slack between the reels 3 and 4 and for removing gaps between the reels and the tape rolls thereon, and delivers such data to the duration modulated pulse generator 31. The duration modulated pulses generated in response to the slack takeup data and gap removal data will be explained in detail in the course of the subsequent discussion of the slack takeup routine and the gap removal routine.

For tape tension control the controller 30 conventionally creates necessary data based upon the tape diameters on the reels 3 and 4. The tape diameters are determined by counting the tape speed pulses, supplied from the tape speed sensor 16 over the line 19, from the moment the BOT or EOT marker is detected by the sensor 22. It is understood that the controller 30 incorporates a bidirectional counter, not shown, to this end, which counts the tape speed pulses in an increasing direction during forward tape travel and in a decreasing direction during reverse tape travel. The tension control data is sent over a line 87 to the DAC 34.

Inputting the digital tension control data, the DAC 34 delivers an analog equivalent thereof to the tension control circuit 35 over a line 38. This circuit generates tension control signals from the tension control data as well as from a motor voltage signal supplied thereto over a line 39 connected to the circuit point between speed control transistor 27 and reel motors 13 and 14. The tension control signals are sent over lines 40 and 41 to the bases of the tension control transistors $Q_3$ and $Q_4$. The emitters of these transistors are coupled to the tension control circuit 35 by way of respective lines 46 and 47 for feedback purposes. The controller 30 is also coupled directly to the tension control circuit 35 by way of a line 42 for supplying thereto a mode signal indicative of whether the tape transport is in read or write (constant speed tape travel) mode or other modes such as slack takeup and gap removal.

Figure 4:
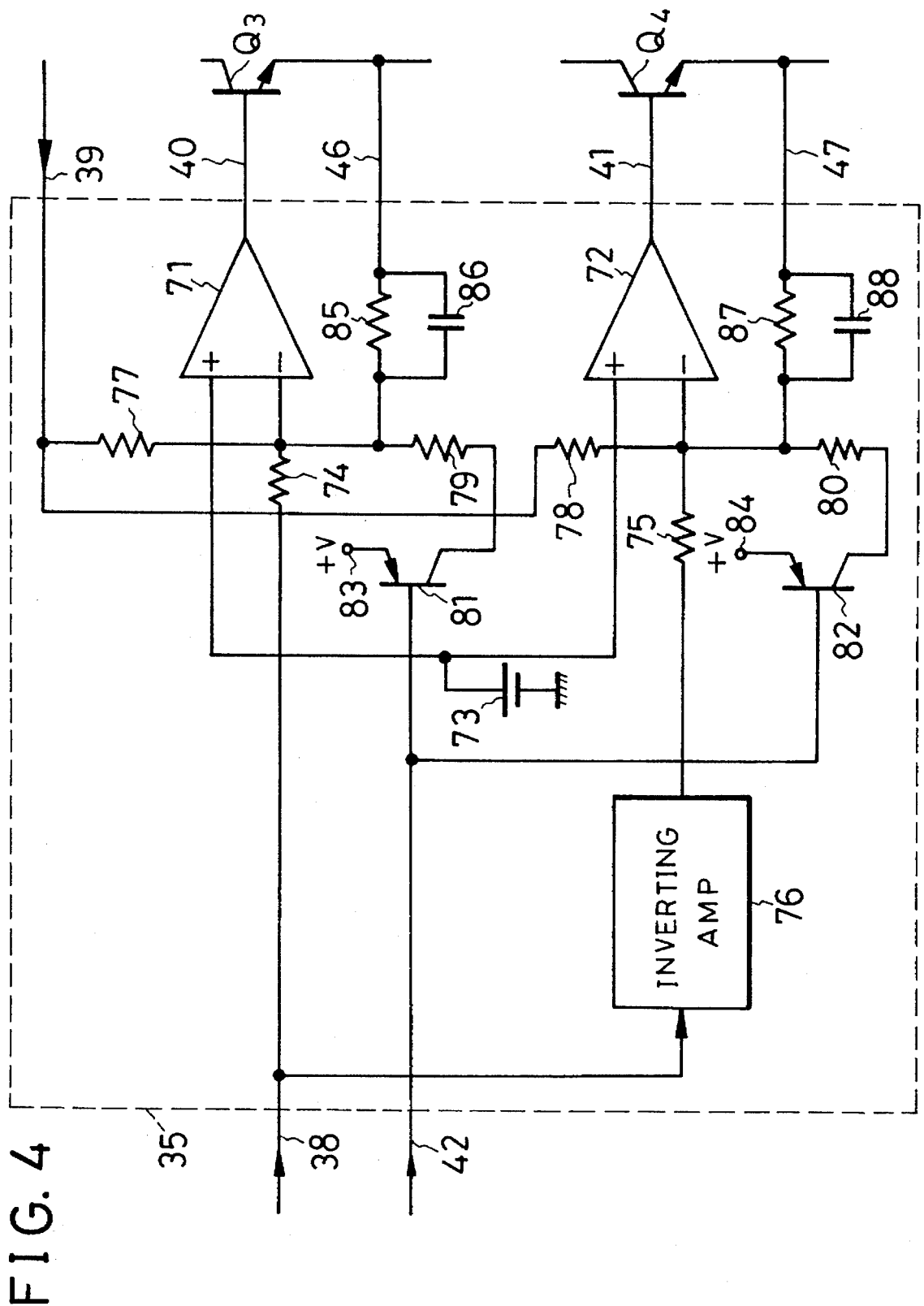
FIG. 4 is a schematic electrical diagram of the tension control circuit included in the FIG. 3 motor control circuit.

As illustrated in detail in FIG. 4, the tension control circuit 35 comprises a first 71 and a second 72 operational amplifier. Both operational amplifiers have their noninverting inputs connected to a reference voltage source 73, and their outputs to the bases of the tension control transistors $Q_3$ and $Q_4$, respectively. The inverting input of the first operational amplifier 71 is connected to the DAC output line 38 via a resistor 74, and the inverting input of the second operational amplifier 72 to the DAC output line 38 via another resistor 75 and an inverting amplifier 76. Further the inverting inputs of both operational amplifiers 71 and 72 are connected to the motor voltage signal line 39 via respective resistors 77 and 78.

Still further, for varying the magnitude of the supply voltage across the reel motors 13 and 14 during constant speed tape travel and during slack takeup, the inverting inputs of the operational amplifiers 71 and 72 are connected to supply terminals 83 and 84 via resistors 79 and 80 and transistors 81 and 82, respectively. The bases of the transistors 81 and 82 are connected to the line 42 in order to be controlled by the noted mode signal.

The emitter of the first tension control transistor $Q_3$ is connected to the inverting input of the first operational amplifier 71 via a parallel connection of resistor 85 and capacitor 86 to form a feedback circuit. The emitter of the second tension control transistor Q4 is likewise connected to the inverting input of the second operational amplifier 72 via a parallel connection of resistor 87 and capacitor 88 to form a feedback circuit.

The mode signal on the line 42 is high during constant speed tape travel, holding the transistors 81 and 82 off. Assume that the tape is now traveling forwardly. Then the analog tension control data dependent upon the decreasing tape diameter on the file reel 3 will be sent over the line 38 to the first operational amplifier 71. The output voltage of this first operational amplifier will become lower in proportion with a decrease in tape diameter on the file reel 3. The result will be a gradual increase in collector-emitter voltage of the first tension control transistor $Q_3$, resulting in turn in a decrease in voltage across the file reel motor 13. The voltage across the takeup reel motor 14, on the other hand, will become higher with an increase in tape diameter on the takeup reel 4, so that the voltage signal applied to the inverting input of the first operational amplifier 71 over the line 39 will increase correspondingly. Thus, in the illustrated embodiment, the tape will be held under constant tension by the combination of the motor voltages and the tension control data. The second operational amplifier 72 does not take part in tension control during forward tape travel because then the second tension control transistor $Q_4$ and resistor $R_2$ are short circuited by the takeup reel motor switching transistor $Q_2$.

During reverse tape travel the second operational amplifier 72 does respond to the analog equivalent of the tension control data supplied from the DAC 34 via the inverting amplifier 76. The resulting tension control operation is similar to that during forward tape travel discussed above.

The mode signal on the line 42 is low when the tape transport is in slack takeup mode and in gap removal mode. The transistors 81 and 82 are therefore both conductive, so that the output magnitudes of the operational amplifiers 71 and 72 are lower than during reading or writing, and so are the voltages across both reel motors 13 and 14. The direction control transistors $Q_1$ and $Q_2$ are jointly turned on and off several times during each slack takeup session, and while these transistors are off, the supply voltage is impressed to the reel motors via the tension control transistors $Q_3$ and $Q_4$ and resistors $R_1$ and $R_2$ for simultaneously energizing the motors in the opposite directions.

Seen at 43 in FIG. 3 is a motor braking circuit. It comprises a resistor 46 connected in parallel with the reel motors 13 and 14 via respective diodes 44 and 45.

The operation of the illustrated tape transport will be first described in terms of the read or write mode and then of the slack takeup mode. The discussion of the gap removal mode, forming the gist of the present invention, will follow that of the slack takeup mode because the gaps between reels and tape rolls thereon are advantageously removed after slack takeup.

Figure 8:
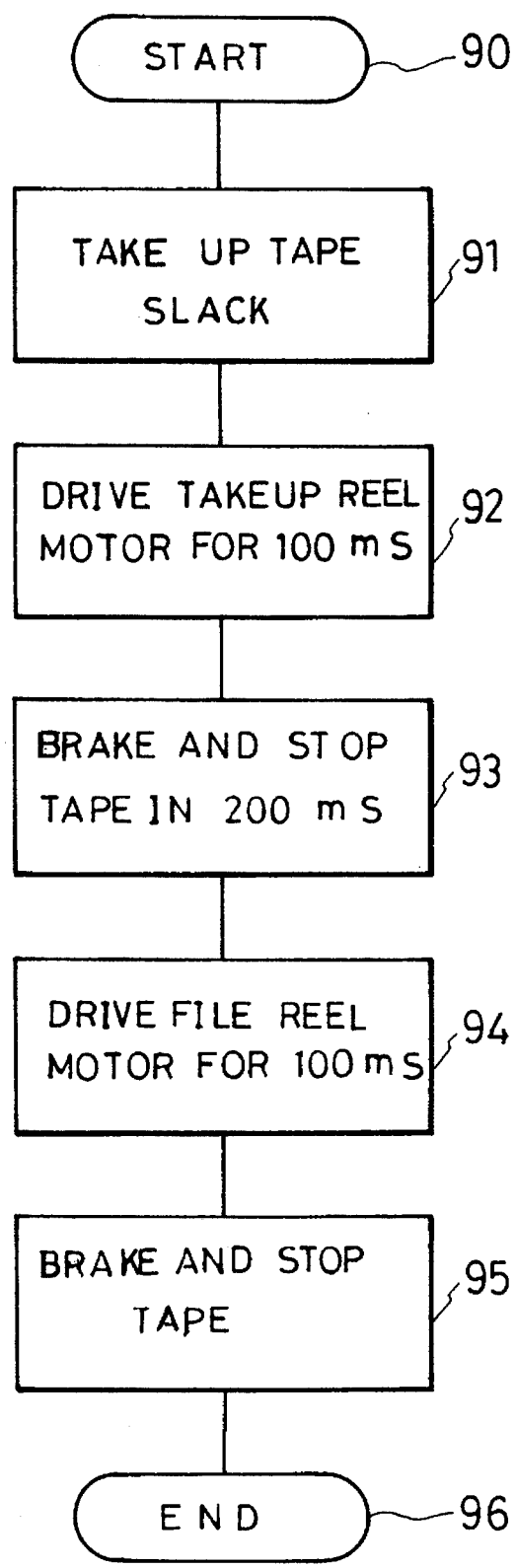
FIG. 8 is a flowchart of a gap removal routine introduced into the controller of the FIG. 3 motor control circuit according to this invention.

Receiving a forward tape run command from the unshown host system over the bus 26, FIG. 8, the controller 30 will respond by causing nonconduction through the file reel motor switching transistor $Q_1$ and conduction through the takeup reel motor switching transistor $Q_2$. Thereupon upon the takeup reel motor 14 will start rotation, being energized through a closed supply circuit comprising the supply terminal 28, speed control transistor 27, motor 14, direction control transistor $Q_2$ and grounding terminal 29.

As the tape 5 thus starts traveling forwardly, the speed sensor 16, FIG. 2, will begin delivering tape speed pulses to the controller 30 over the line 19. The controller 30 will then respond by creating speed control data accordingly, for delivery to the duration modulated pulse generator 31. The duration modulated speed control pulses from the generator 31 will be translated by the voltage converter 32 into an equivalent unidirectional voltage for controlling the collector-emitter resistance of the speed control transistor 27. There will thus be completed a tape speed control servo loop whereby the supply voltage across the takeup reel motor 14 will be controlled so as to hold constant the traveling speed of the tape.

Tape tension during such forward tape travel is controlled by energizing the file reel motor 13 in a direction opposite to the rotational direction of the takeup reel motor 14. The supply voltage across the file reel motor 13 must be varied according to the varying diameters of the tape rolls on both reels. To this end, as has been stated, the controller 30 ascertains the tape roll diameters for holding the tape under constant tension in the face of such varying diameters. The tension control data is supplied via the DAC 34 to the tension control circuit 35 for controlling the first tension control transistor $Q_3$ accordingly. The tension control circuit 35 relies also on the variable supply voltage across the takeup reel motor 14 for the determination of the voltage impressed to the first tension control transistor $Q_3$, as has been set forth with reference to FIG. 4.

During reverse tape travel, on the other hand, the file reel motor switching transistor $Q_1$ is on, and the takeup reel motor switching transistor $Q_2$ off. Tape tension is controlled by the tension control signal supplied as above from the tension control circuit 35 to the base of the second tension control transistor $Q_4$.

The slack takeup routine introduced into the controller 30 is invoked in the following three cases:

1. When the tape cassette is loaded.
2. When the tape speed sensor 16 fails to generate a tape speed pulse for more than a predetermined length of time (e.g. 230 milliseconds) at the start of, or during, tape travel.
3. When a predetermined number (e.g. three) of tape speed pulses are generated consecutively with a cycle that exceeds their normal cycle during constant speed tape travel to a predetermined degree (e.g. 1.3 times).

Figure 5:
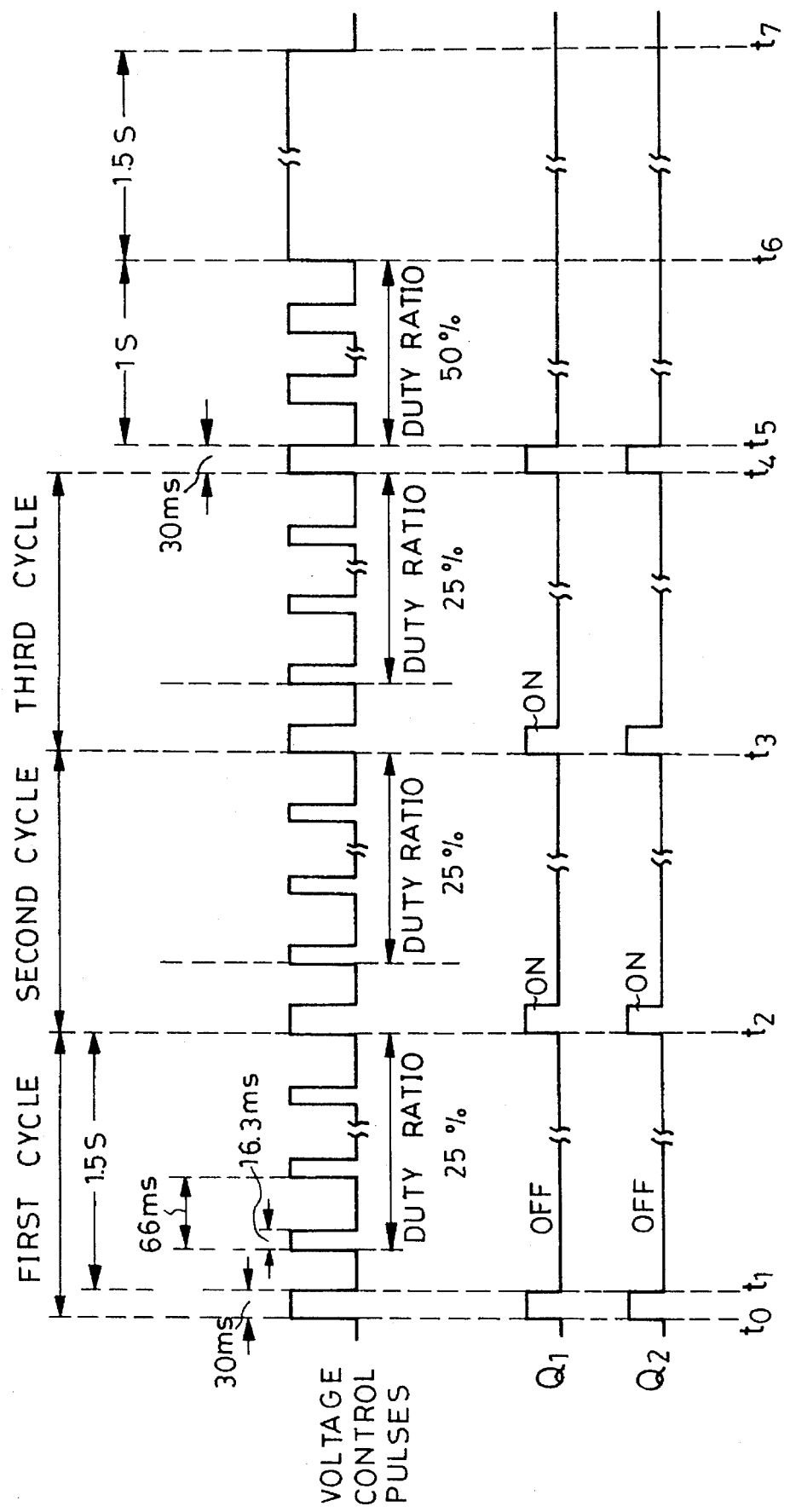
FIG. 5 is a diagram of waveforms appearing in various parts of the FIG. 3 motor control circuit during slack takeup operation.
Figure 6:
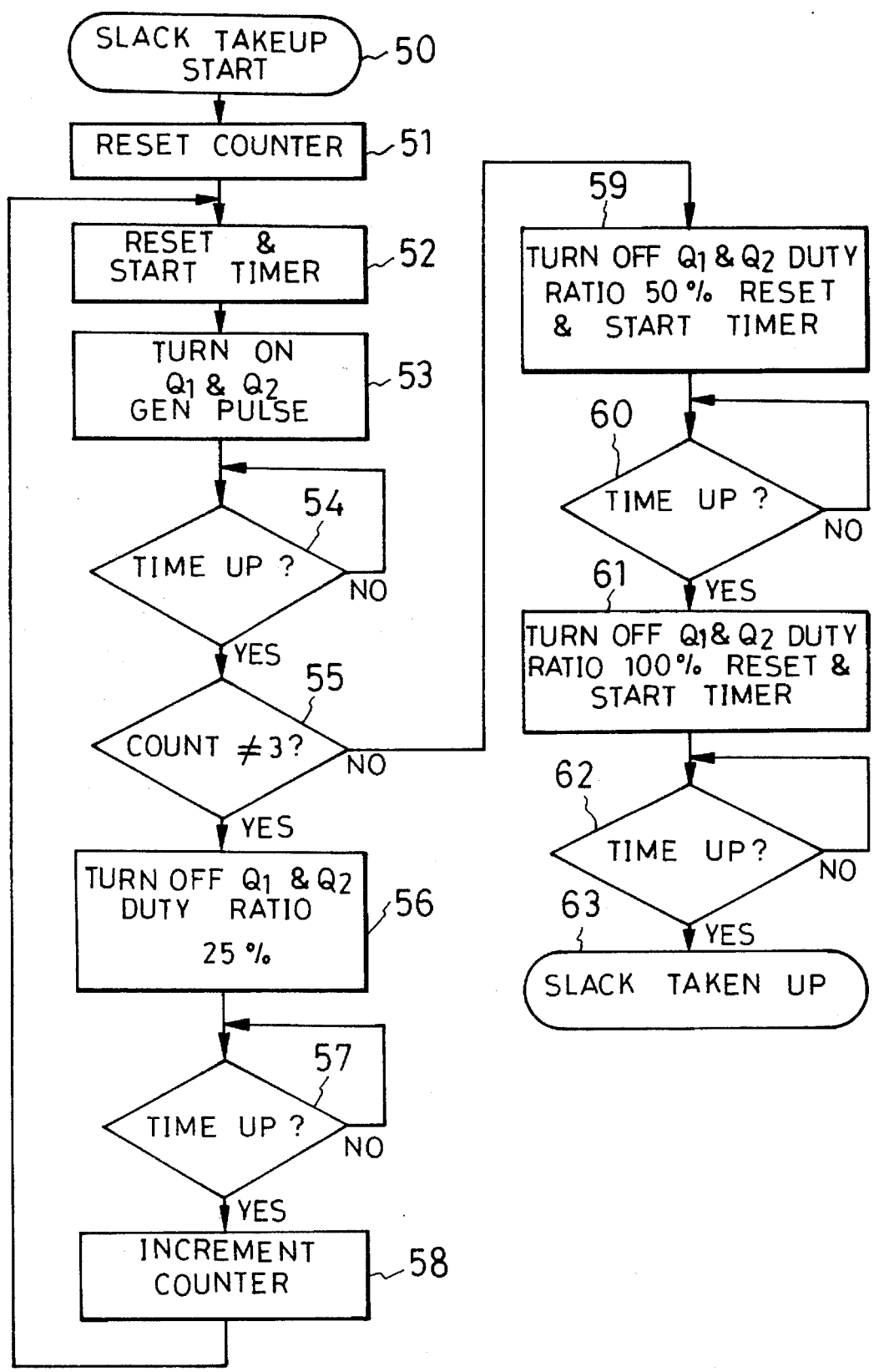
FIG. 6 is a flowchart of a slack takeup routine introduced into the controller of the FIG. 3 motor control circuit.

The following description of slack takeup operation will be better understood by referring to FIGS. 5 and 6. Shown in FIG. 5 are the duration modulated speed control pulses produced by the pulse generator 31, FIG. 3, for controlling the tape speed, and the signals supplied from the controller 30 to the bases of the direction control transistors $Q_1$ and $Q_2$ during each slack takeup session. FIG. 6 is a flowchart of the slack takeup routine which is factory preprogrammed into the controller 30.

The slack takeup routine starts at 50 in FIG. 6 when, for example, the loading of the tape cassette 1 is sensed by the cassette sensor 20. Then, at the next block 51, a slack takeup counter, not shown, is reset which is built into the controller 30 for counting the cycles of slack takeup operation to be set forth hereafter. A timer, also not shown, built into the controller 30 is also reset and immediately caused to start measuring time at a block 52. At the next block 53, which is concurrent with the block 52, both direction control transistors $Q_1$ and $Q_2$ are turned on, and the duration modulated pulse generator 31 is caused to go high and remain so until the timer measures a preassigned brief time of, say, 30 milliseconds at a logical node 54.

The above 30 milliseconds period is depicted in FIG. 5 as from time $t_0$ time $t_1$. This period is very short compared with the length of time required for taking up the expected maximum tape slack by the joint energization of both reel motors 13 and 14, so much so that the tape will remain loose, if it has been so, at the end of the $t_0$-$t_1$ time interval.

Next comes another logical node 55 which questions whether the slack takeup counter has counted up to three. The count at the time $t_1$ in FIG. 5 is zero. Therefore, at the next block 56, the direction control transistors $Q_1$ and $Q_2$ are both turned off, and the pulse generator 30 is caused to generate duration modulated speed control pulses at a duty radio of 25%. The reel motors 13 and 14 will be driven through the circuits comprising the tension control transistors $Q_3$ and $Q_4$ and resistors $R_1$ and $R_2$ for taking up the tape slack when both direction control transistors $Q_1$ and $Q_2$ are turned off as above. The cycle of the speed control pulses may be set at 66 milliseconds in slack takeup, so that the pulses have each a duration of 16.3 milliseconds when their duty ratio is set at 25%.

The conditions set up at the block 56 are maintained a preassigned length of time, preferably, approximately 1.5 seconds. The first cycle of slack takeup operation comes to an end upon lapse of this length of time, as indicated at a node 57. The slack takeup counter is therefore incremented to one at a block 58. The first cycle ends at time $t_2$ in FIG. 5.

The second cycle of slack takeup operation starts as the routine returns from block 58 to block 52. The procedure of the steps 52–57 is then repeated, and the slack takeup counter is incremented to two at the block 58 when the second cycle is competed at time $t_3$ in FIG. 5.

The third cycle is similarly repeated from time $t_3$ to time $t_4$ in FIG. 5. The slack takeup counter is incremented to three at the end of this third cycle.

In all likelihood, the type slack may have been fully removed by the foregoing three cycles of takeup operation. Possibly, however, the tape may not yet be stretched tight enough for writing or reading. It is therefore recommended that the tape be tensed after slack removal, through the following procedure.

The slack takeup routine temporarily returns to the block 52 upon completion of the third cycle, and another 30 milliseconds is measured by the timer. This 30 milliseconds period is from time $t_4$ to time $t_5$ in FIG. 5, during which period the direction control transistors $Q_1$ and $Q_2$ are both held on, and the pulse generator 31 is caused to put out a pulse, according to the block 53. At the time $t_5$ the routine branches off from the node 55 to a block 59, at which the direction control transistors $Q_1$ and $Q_2$ are turned off. Further, at this block 59, the duty ratio of the speed control pulses is increased to, say, 50%, and the timer is reset and restarted.

Another preassigned length of time, preferably one second or so, is measured from the time $t_5$ at a node 60. Then, at the next block 61, and at the time $t_6$ in FIG. 5, the pulse generator is set for operation with a duty ratio of 100%, and the timer is again reset and restarted, with the direction control transistors $Q_1$ and $Q_2$ held off. Still another preassigned length of time, preferably one and a half seconds or so, is measured from the time $t_6$ at a node 62, whereupon the slack takeup routine comes to an end at 63, and at time $t_7$ in FIG. 5. The total period from time to time $t_7$ is so predetermined that the tape will be freed from the expected maximum slack and subsequently stretched tense enough for the commencement of writing or reading.

A reconsideration of FIG. 5 will reveal that the highest possible drive voltage is applied to the reel motors 13 and 14 for the first 30 milliseconds of each of the three slack takeup cycles, that is, for 30 milliseconds after the times $t_0$, $t_2$ and $t_3$. The reel motors can thus be positively started up for taking up the tape slack while being subsequently energized intermittently. A continued application of such high drive voltage would be undesirable because then the tape might jam and so be destroyed, particularly if it had slacked too much.

It is for this reason that the direction control transistors $Q_1$ and $Q_2$ are turned off, and the duty ratio of the duration modulated speed control pulses set as low as 25%, after the initial 30 milliseconds of each slack takeup cycle. The reel motors 13 and 14 are then intermittently energized with much lower drive voltages through the circuits comprising the tension control transistors $Q_3$ and $Q_4$ and resistors $R_1$ and $R_2$. However, an energization of the reel motors with such reduced voltages alone would also be objectionable because then the slack might not be removed in cases where the motors were heavily loaded for some reason or other. The application of the full drive voltage for the 30-millisecond periods after the times $t_0$, $T_2$ and $t_3$ is intended to defeat this risk.

After the last application of the full drive voltage during the $t_4 - t_5$ time interval, the duty ratio of the speed control pulses is increased to 50% and then to 100% at the time $t_6$. The tape will thus be gradually stretched out after the slack takeup and held fully taut by the time $t_7$.

The foregoing discussion of the slack takeup routine has presupposed that the controller 30 has invoked it in response to the loading of the tape cassette 1 as sensed by the cassette sensor 20. As has been stated, another justification for the execution of the slack takeup routine is an undue decrease in the repetition frequency of the tape speed pulses generated by the speed sensor 16, with the imminent danger of servo hunting. It is therefore recommended that the controller 30 be furnished with the function of constantly monitoring the tape speed pulses for the lengths of their cycles.

Figure 7:
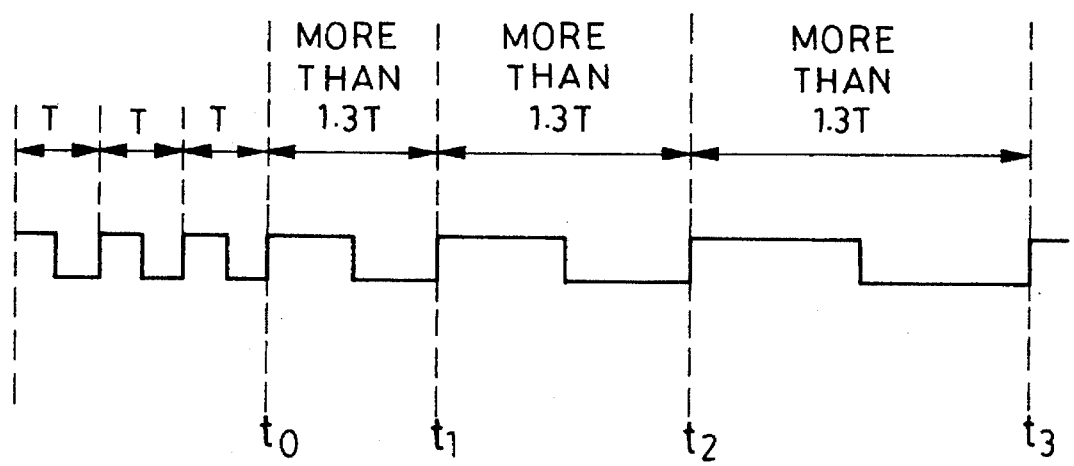
FIG. 7 is a waveform of tape speed control pulses which is explanatory of one occasion on which the FIG. 6 slack takeup routine is invoked.

FIG. 7 indicates an example of possible variations in the cycles of the tape speed pulses that may occur during tape travel in the constant speed mode. The tape speed pulses are shown to have a predetermined normal period T before time $t_o$. The periods of the next three consecutive pulse cycles $t_o-t_1$, $t_1-t_2$ and $t_2-t_3$ are all shown to be more than 1.3 times the normal period T. Thereupon the controller may override the constant speed servo control of the tape and trigger off the slack takeup routine of FIG. 6.

Still another justification for the slack takeup routine is the non-production of tape speed pulses for a prolonged period of time at the starting period of, or during, tape travel. Thereupon the motor control circuit would conventionally function to increase the motor drive voltage and, in event no tape sped pulse was nevertheless produced, to set the motors out of rotation. An objection to this practice is that the supply side reel might continue rotation by inertia, possibly producing a great deal of tape slack.

Therefore, in the illustrated embodiment, the slack takeup routine is invoked in the case where the tape speed sensor produces no pulse for a preassigned time of, say, 230 milliseconds. The tape slack, no matter how long it may be, will be smoothly and thoroughly taken up as the motors are energized in the opposite directions with drive voltages of well calculated magnitudes during the progress of the slack takeup routine flowcharted in FIG. 6.

FIG. 8 is a flowchart of the gap removal routine programmed in the controller 30 for removing possible gaps that may have been thermally created between the reels 3 and 4 of the tape cassette 1 and the tape rolls on the reels. The following description of this gap removal routine will be better understood by referring also to FIG. 9 which shows how the direction control transistors $Q_1$ and $Q_2$, FIG. 3, are turned on and off during the progress of the gap removal routine.

The gap removal routine starts at 90 in FIG. 8 in response to the loading of the tape cassette 1 in the tape transport, as sensed by the cassette sensor 20, FIG. 2. The next block 91 of the gap removal routine is the removal of a possible tape slack according to the FIG. 6 routine. As set forth previously, the controller 30 initiates the slack takeup routine whenever the tape cassette is loaded, with the complete data processing system powered on, or when the system is powered on with the tape cassette loaded. The actual gap removal routine follows the slack takeup routine. A tape slack, if any, will have been thoroughly eliminated by the slack takeup routine. However, the reel motors 13 and 14 are energized with such low voltages, or for such brief periods of time, during the slack takeup routine that the possible gaps between the reels 3 and 4 and the tape rolls thereon may not have been removed. The application of higher drive voltages to the reel motors 13 and 14, and for longer periods of time, is desirable for positive gap removal.

Figure 9:
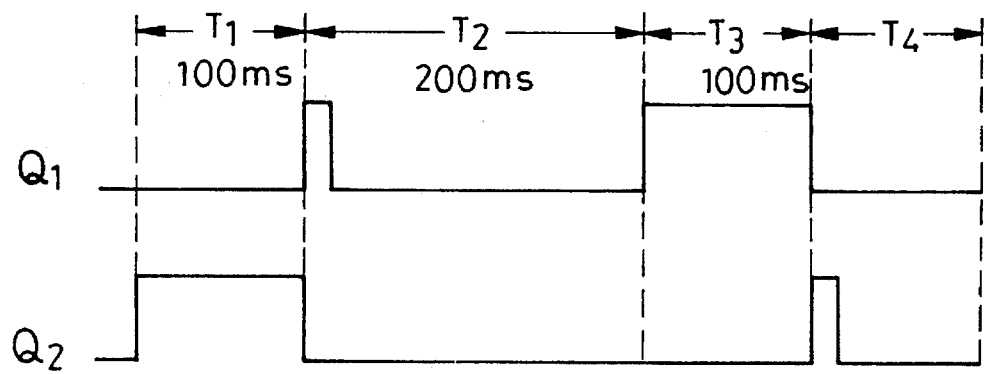
FIG. 9 is a waveform diagram useful in explaining the FIG. 8 gap removal routine.

As set forth in a block 92 in FIG. 8, the actual first step of the gap removal routine is to drive the takeup reel motor 14 in the direction for winding up the tape, for a preassigned length of time $T_1$, FIG. 9, which typically is 100 milliseconds. This time $T_1$ is measured by the counter or timer, not shown, built into the controller 30. For such driving of the takeup reel motor 14 the controller 30 causes nonconduction through the first direction control transistor $Q_1$, and conduction through the second direction control transistor $Q_2$, as indicated in FIG. 9. Consequently, the takeup reel motor 14 will be energized through the closed circuit comprising the supply terminal 28, speed control transistor 27, second direction control transistor $Q_2$ and grounding terminal 29.

During such energization of the takeup reel motor 14, the speed control transistor 27 is so controlled as to cause the application thereto of a voltage required for tape travel at the normal data transfer speed of, say, 60 inches per second. The takeup reel 4 will rotate with the motor thereby removing the gap, if any, between itself and the tape roll thereon. The tape 5 will travel forwardly if the gap is removed well before the lapse of 100 milliseconds. Normally, the period of such forward tape travel will be so short that the tape speed will almost never come up to 60 ips.

Next comes the block 92 according to which the tape is braked to a stop during a preassigned length of time $T_2$, typically, 200 milliseconds. The braking stop of the tape is accomplished as the controller 30 causes nonconduction through the second direction control transistor $Q_2$ and, instead, conduction through the first direction control transistor $Q_1$ for a very brief starting period of the time $T_2$ immediately following the nonconduction of the second direction control transistor, as will be understood from FIG. 9. Thus braked by the file reel motor 13, the tape will come to a rapid stop before the end of the time $T_2$.

It will also be noted from FIG. 9 that both direction control transistors $Q_1$ and $Q_2$ are off after the brief starting period of the time $T_2$. This means that the servo control loops of the reel motors 13 and 14 are open, precluding the danger of hunting.

Following the end of the time $T_2$, when the tape is at a standstill, the controller 30 turns the first direction control transistor $Q_1$ on, and the second direction control transistor $Q_2$ off, and holds them so for a prescribed length of time $T_s$ (e.g. 100 milliseconds) according to the next block 94 of the gap removal routine. The file reel motor 13 will then rotate in the direction for winding up the tape. In this case, too, the speed control transistor 27 is so controlled as to cause the application to the file reel motor of a voltage required for tape travel at the normal data transfer speed. The file reel 3 will rotate with the file reel motor with the consequent removal of the gap, if any, between itself and the tape roll thereon.

In practice the diameters of the tape rolls on the file reel and takeup reel will vary from case to case, and so will the sizes of the gaps between them. The successive driving of the takeup and file reel motors in the opposite directions, as above, is desirable for infallibly removing the gaps of such variable sizes from both reels. As an additional advantage, the longitudinal position of the tape relative to the head 8, FIG. 2, will remain unchanged before and after the removal of the gaps.

The file reel motor 13 is deenergized, and the tape braked to a stop, upon lapse of the 100 milliseconds period $T_3$ according to the block 95. FIG. 9 shows that the takeup reel motor 14 is briefly energized for braking the tape, and both motors are held unenergized thereafter until the end of an additional period of time $T_4$. Then the gap removal routine comes to an end at 96.

The 100 milliseconds length of the periods $T_1$ and $T_3$ in FIG. 9 are a careful choice. Experiment has proved that it takes from approximately 50 to 150 milliseconds from the moment the energization of the file or takeup reel motor is started to the moment the spacings of the tape speed pulses abruptly decrease. There is no possibility for the hunting of the tape speed control servo to take place in 100 milliseconds. The lengths of the periods $T_1$ and $T_2$ must also be determined from the standpoint of positively removing the gaps, which vary in size as aforesaid. Generally, the lengths of the periods $T_1$ and $T_3$ can be from 30 to 500 milliseconds, preferably from 50 to 150 milliseconds.

The controller 30 conventionally proceeds to the tape initialization routine following the slack takeup and gap removal routine of FIG. 8 upon loading of the tape cassette. The initialization routine is such that the tape is first driven forward at 30 ips for two seconds, then reversed at 60 ips until the transparent leader at the beginning of the tape, then forwarded again at 60 ips until the BOT marker is detected, and then reversed again at 60 ips to a preassigned position on the beginning tape leader. The tape is now ready for the commencement of data transfer.

The hunting of the tape speed control servo will not occur during the initialization routine since the gaps between the reels and the tape rolls thereon have been removed by the preceding gap removal routine. This gap removal is itself preceded by the slack takeup routine, so that the gaps can be positively removed. It might be contemplated to remove the gaps at the same time with slack takeup, by making the torques of the reel motors higher. This measure is objectionable because then the tape would be more likely to jam through servo hunting. The motor torques should be lower during slack takeup because the slack takeup routing is implemented on occasions other than the loading of the tape cassette.

Despite the foregoing detailed disclosure, it is not desired that the invention be limited by the exact showing of the drawings or the description thereof. For example, instead of providing the duration modulated pulse generator 31 and voltage converter 32 shown in FIG. 3, the tape speed pulses could be directed into a frequency to voltage converter to form the supply voltage control signal for application to the base of the transistor 27. Also, instead of directly measuring the traveling speed of the tape by the tape speed sensor 16, FIG. 2, the tape speed could be measured from the speed of rotation of either or both of the cassette reel drive spindles 3a and 4a, although in this case the output from the spindle speed sensor or sensors would have to be amended according to tape diameters on both reels to provide a signal representative of the traveling speed of the tape.

All these and other modifications, alterations and adaptations of the illustrated embodiment within the usual knowledge of those skilled in the tape transport and allied arts are considered to fall within the scope of the invention as expressed in the attached claims.

What is claimed is:

1. In a tape transport for use with a tape assembly to be loaded in, and unloaded from, the tape transport, the tape assembly having a length of tape extending between a pair of reels within a housing, wherein the tape transport includes a pair of reel motors to be coupled one to each reel of the tape assembly for bidirectional tape transportation between the reels, a method of running the tape of the tape assembly, comprising the steps of:

(a) sensing the loading of the tape assembly in the tape transport;

(b) taking up a possible tape slack between the reels of the tape assembly by simultaneously energizing the pair of reel motors in opposite directions after the loading of the tape assembly is sensed, the step of simultaneously energizing the pair of reel motors including at least one slack takeup cycle comprising the steps of:

(i) simultaneously energizing the pair of reel motors with a first voltage for a third preassigned length of time, and (ii) simultaneously energizing the pair of reel motors with a second voltage, lower than the first voltage, for a fourth preassigned length of time longer than the third preassigned length of time;

(c) energizing one of the reel motors for a first preassigned length of time for rotating one associated reel of the tape assembly in a direction for winding up the tape onto said one reel after the tape slack is taken up; and (d) energizing the other of the reel motors for a second preassigned length of time for rotating the other reel of the tape assembly in a direction for winding up the tape onto said other reel after the one of the reel motors is energized for the first preassigned length of time, thereby removing gaps, if any, that may have been thermally created between the reels of the tape assembly and rolls of the tape thereon.

2. The method of claim 1 further comprising steps for tensing the tape between the pair of reels of the tape assembly after the slack is taken up and before step (c), the tape being tensed by the steps of:

(i) simultaneously energizing the pair of reel motors with the first voltage for the third preassigned length of time;

(ii) simultaneously energizing the pair of motors with a third voltage, lower than the first voltage and higher than the second voltage, for a fifth preassigned length of time; and (iii) simultaneously energizing the pair of reels motors with a fourth voltage, lower than the first voltage and higher than the third voltage, for a sixth preassigned length of time.

3. The method of claim 2 wherein in steps (c) and (d) the reel motors are energized with a fifth voltage higher than the first voltage.

4. A tape transport for use with a tape assembly to be loaded in, and unloaded from, the tape transport, the tape assembly having a length of tape extending between a pair of reels within a housing, the tape transport comprising:

(a) a transducer for data transfer with the tape of the tape assembly;

(b) a power supply having a first and a second supply terminal;

(c) a pair of reel motors connected in parallel with each other between the first and the second supply terminals for driving the respective reels of the tape assembly in opposite directions;

(d) a speel control element connected between the first supply terminal and the pair of motors;

(e) a pair of switches connected one between each motor and the second supply terminal;

(f) a tension control circuit connected between the pair of motors and the second supply terminal;

(g) a tape speed sensor for providing a tape speed signal indicative of the speed of the tape traveling in either direction between the pair of reels;

(h) a tape assembly sensor for sensing the loading of the tape assembly in the tape transport; and (i) control means connected to the pair of switches for controlling the traveling direction of the tape between the pair of reels, to the speed control element and the tape speed sensor for controlling the speed control element in response to the tape speed signal so as to cause the tape to travel at constant speed through a tape speed control servo during data transfer with the transducer, to the tension control circuit for holding the tape under constant tension, and to the tape assembly sensor for rotating one of the reels of the tape assembly for a first preassigned length of time in a direction for winding up the tape onto said one reel after the loading of the tape assembly is sensed, and for subsequently rotating the other of the reels of the tape assembly for a second preassigned length of time in a direction for winding up the tape onto said other reel and responsive to an output from the tape assembly sensor for simultaneously and intermittently closing the pair of switches in order to cause the pair of reel motors to be energized in opposite directions with a first voltage from the power supply means, and, while the switches are open, for causing the pair of reel motors to be energized in opposite directions with a second voltage, lower than the first voltage, from the power supply via the tension control circuit, thereby taking up a possible tape slack between the pair of reels of the tape assembly before the gaps are removed;

(j) whereby gaps, if any, that may have been thermally created between the reels of the tape assembly and rolls of the tape thereon are removed.

* * * * *